United States Patent
Hightower

(10) Patent No.: US 6,609,338 B2
(45) Date of Patent: Aug. 26, 2003

(54) ADJUSTABLE RETAINER CLIP

(75) Inventor: Robert C. Hightower, High Point, NC (US)

(73) Assignee: Tenn-Tex Plastics, Inc., Colfax, NC (US)

( * ) Notice: Subject to any disclaimer, the term of this patent is extended or adjusted under 35 U.S.C. 154(b) by 34 days.

(21) Appl. No.: 09/847,231

(22) Filed: May 2, 2001

(65) Prior Publication Data

US 2002/0162289 A1 Nov. 7, 2002

(51) Int. Cl.[7] ............................................... E06B 3/964
(52) U.S. Cl. ........................ 52/204.65; 52/204.64; 52/127.11; 292/241; 411/354
(58) Field of Search .................. 52/204.65, 204.64, 52/204.66, 204.67, 127.6, 127.11, 582.2, 584.1; 428/446, 447, 412; 292/241; 411/354, 535, 536

(56) References Cited

U.S. PATENT DOCUMENTS

| | | | |
|---|---|---|---|
| 3,146,502 A | | 9/1964 | Reiss, Sr. et al. ............. 20/56.1 |
| 3,637,416 A | * | 1/1972 | Misch et al. ............. 351/160 R |
| 4,210,699 A | * | 7/1980 | Schroeter et al. ........... 351/166 |
| 4,218,508 A | * | 8/1980 | Humphrey, Jr. ............. 427/160 |
| 4,549,831 A | * | 10/1985 | Lautenschlager, Jr. ....... 403/231 |
| 4,611,841 A | * | 9/1986 | Ravinet ....................... 292/241 |
| 4,813,726 A | * | 3/1989 | Ravinet ....................... 292/241 |
| 5,590,975 A | * | 1/1997 | Horntvedt ................. 403/407.1 |
| 5,688,003 A | * | 11/1997 | Beale .......................... 292/202 |
| 5,919,018 A | * | 7/1999 | Chuang ....................... 411/149 |
| 5,919,572 A | * | 7/1999 | Blum et al. .................. 428/446 |
| 5,953,882 A | * | 9/1999 | Vallance et al. .............. 52/766 |
| 6,070,919 A | * | 6/2000 | Finkelstein ................ 292/111 |
| 6,079,754 A | * | 6/2000 | Alexy ........................ 292/101 |
| 6,131,346 A | * | 10/2000 | Kordes ........................ 52/235 |
| 6,148,569 A | * | 11/2000 | Giovannetti ............. 52/127.11 |
| 6,155,010 A | * | 12/2000 | Becken et al. ........... 52/204.61 |
| 6,254,983 B1 | * | 7/2001 | Namiki ....................... 428/215 |

FOREIGN PATENT DOCUMENTS

EP             0496187      * 12/1991            E04B/2/96

* cited by examiner

*Primary Examiner*—Carl D. Friedman
*Assistant Examiner*—Chi Q. Nguyen
(74) *Attorney, Agent, or Firm*—Myers Bigel Sibley & Sajovec

(57) ABSTRACT

A retainer clip includes a shaft extending along a clip axis. The shaft has a shaft diameter and first and second opposed ends. A head extends radially outwardly from the shaft adjacent the first end of the shaft. The head has a head diameter which is greater than the shaft diameter. The head includes a cam surface extending circumferentially about the shaft and facing the second end. At least two portions of the cam surface located at different circumferential positions about the shaft are disposed at different axial distances from the second end. A frame/panel assembly may be formed by mounting and retaining a panel member in a frame using one or more of the retainer clips.

35 Claims, 7 Drawing Sheets

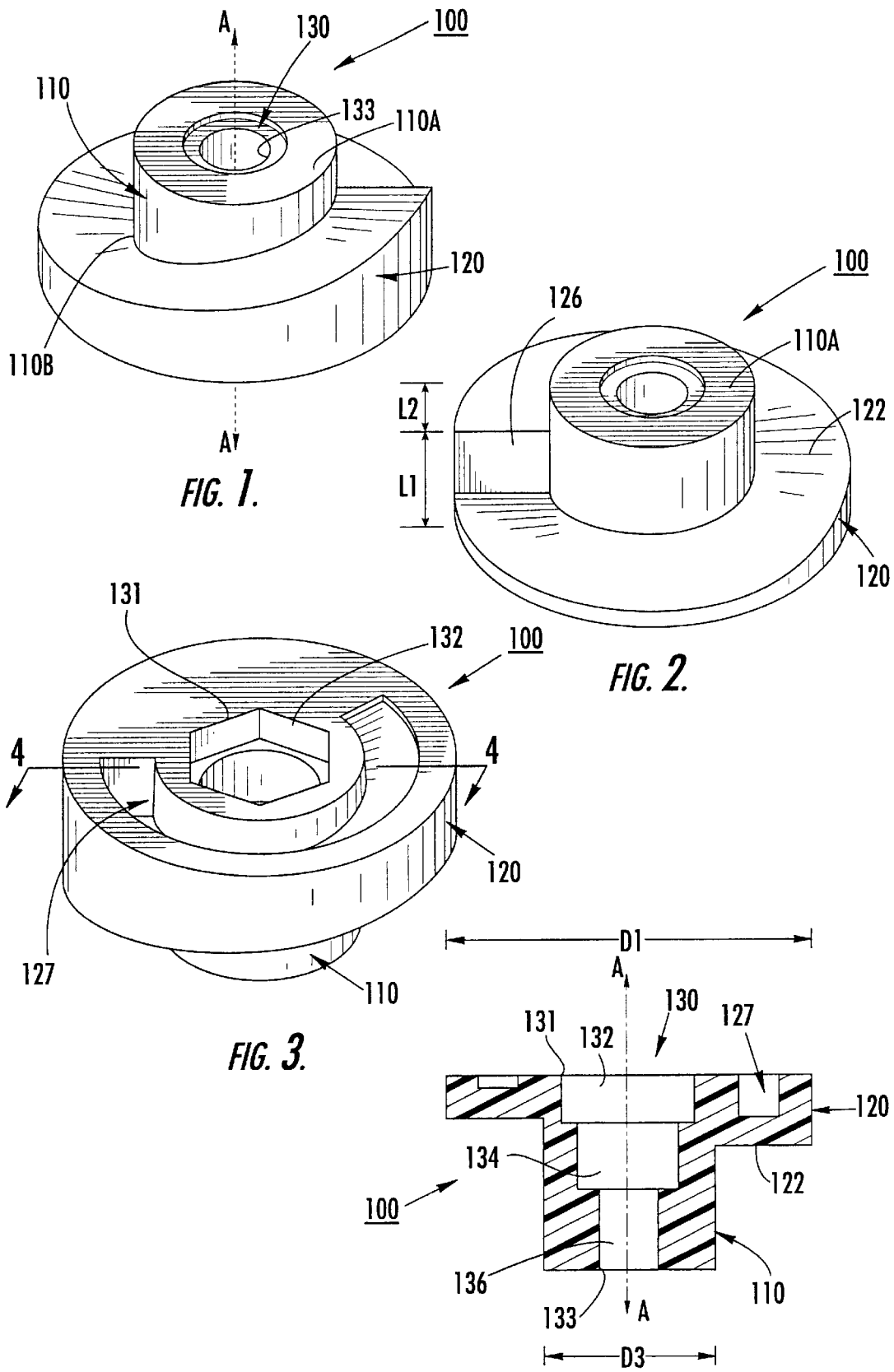

ADJUSTABLE RETAINER CLIP

FIELD OF THE INVENTION

The present invention relates to securing clips and, more particularly, to a clip for retaining a panel in a frame.

BACKGROUND OF THE INVENTION

Doors, windows, and various other furniture and architectural elements often employ a transparent, translucent, opaque or mirrored panel (usually formed of glass or plastic) mounted in a surrounding frame. Often, particularly in the case of interior components, one or more retaining clips are used to hold the panel in the frame.

An exemplary retaining clip and assembly often used to hold glass panels in doors of cabinets are disclosed in U.S. Pat. No. 3,146,502 to Reiss, Sr., et al. Such clips have a portion that is fastened to the frame and an extending member that abuts the glass panel to hold it in place.

Unfortunately, those clips may be difficult to install and may not accommodate panels of different thicknesses. In order to accommodate panels of different thicknesses, the clips may be modified to include interchangeable, deformable spacers/inserts that fit onto the extending member and engage the panel. Such modified clips may be difficult to use. Also, unless a large number of inserts are available, the clips may satisfactorily accommodate only a limited number of panel thicknesses. Moreover, these clips can be more costly to manufacture (by virtue of requiring two components to be constructed) and to install.

SUMMARY OF THE INVENTION

According to preferred embodiments of the present invention, a retainer clip includes a shaft extending along a clip axis. The shaft has a shaft diameter and first and second opposed ends. A head extends radially outwardly from the shaft adjacent the first end of the shaft. The head has a head diameter which is greater than the shaft diameter. The head includes a cam surface extending circumferentially about the shaft and facing the second end. At least two portions of the cam surface located at different circumferential positions about the shaft are disposed at different axial distances from the second end.

Preferably, the cam surface slopes axially about the circumference of the shaft. More preferably, at least a portion of the cam surface is helically shaped. The clip may include a tool engaging structure which is adapted to engage a tool for rotating the clip about the clip axis.

The clip may be formed of a polymeric material. The clip may be a unitarily molded piece. The clip may include a body formed of a first material and an engagement layer formed of a second, relatively softer material, wherein the cam surface forms a part of the engagement layer.

According to further preferred embodiments of the present invention, a frame/panel assembly includes a frame member having a mounting surface and a retainer clip as described above. The clip is secured to the mounting surface such that the clip is rotatable about the clip axis and the cam surface and the frame define a gap therebetween. The assembly further includes a panel member including an edge portion disposed in the gap. The panel member is retained on the frame by the head of the clip.

The frame/panel assembly may include a central passage extending through the head and the shaft, and a fastener extending through the central passage and into the frame. The clip is rotatable about the fastener. A flexible spacer may be interposed between the fastener and the clip. The frame/panel assembly may include a clip bore defined in the frame, the shaft being disposed in the clip bore.

According to preferred methods of the present invention, a method for retaining a panel member on a frame member includes placing the panel member on the frame member and mounting a retainer clip as described above on the frame member such that the clip is rotatable about a clip axis. The cam surface and the frame define a gap therebetween and an edge portion of the panel member is disposed in the gap. The clip is rotated relative to the frame member about the clip axis such that the cam surface reduces the size of the gap, thereby clamping the panel member between the frame member and the cam surface.

The method may further include the steps of forming a bore in the frame member and inserting the shaft of the clip into the bore. The step of mounting the clip on the frame member may include inserting a fastener through a central passage extending through the head and the shaft and into the frame. The step of rotating the clip relative to the frame member may include rotating the clip about the fastener. The step of rotating the clip relative to the frame member may include engaging a tool engaging structure of the clip with a tool and rotating the clip using the tool.

Objects of the present invention will be appreciated by those of ordinary skill in the art from a reading of the Figures and the detailed description of the preferred embodiments which follow, such description being merely illustrative of the present invention.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a bottom, rear perspective view of a retainer clip according to embodiments of the present invention;

FIG. 2 is a bottom, front perspective view of the retainer clip of FIG. 1;

FIG. 3 is a top, front perspective view of the retainer clip of FIG. 1;

FIG. 4 is a cross-sectional view of the retainer clip of FIG. 1 taken along the line 4—4 of FIG. 3;

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 10:
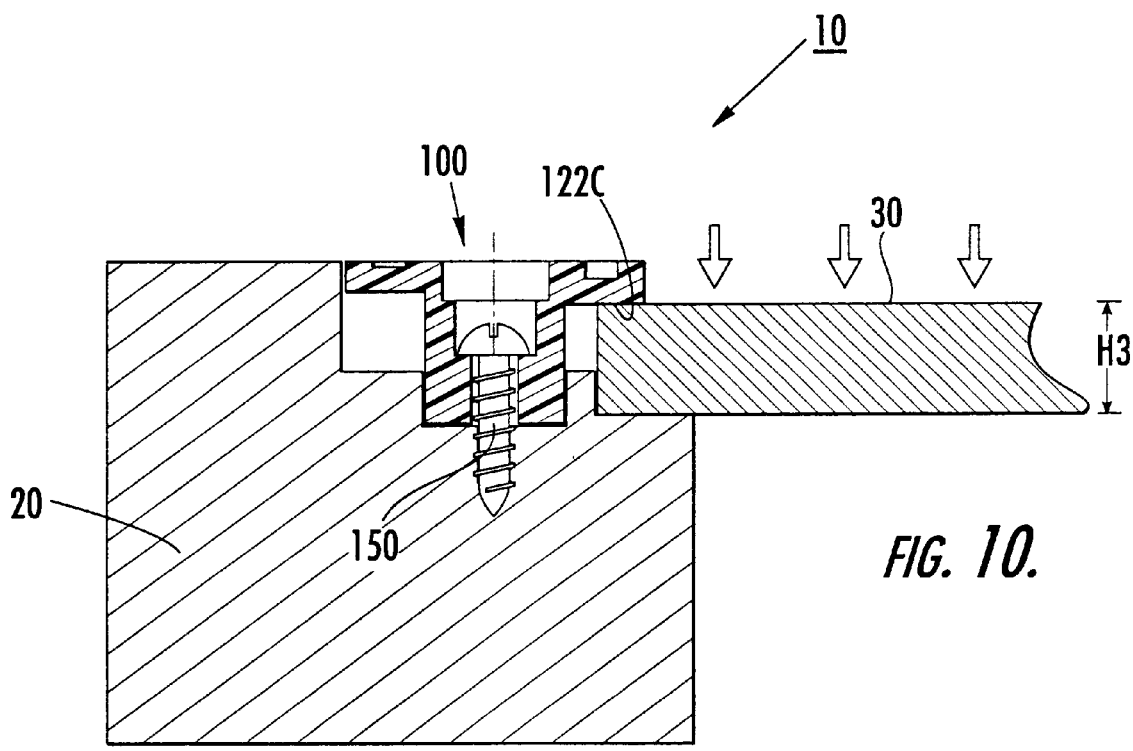
FIG. 10 is a cross-sectional view of the frame/panel assembly of FIG. 8 wherein the clip is in a third, clamped position.
Figure 11:
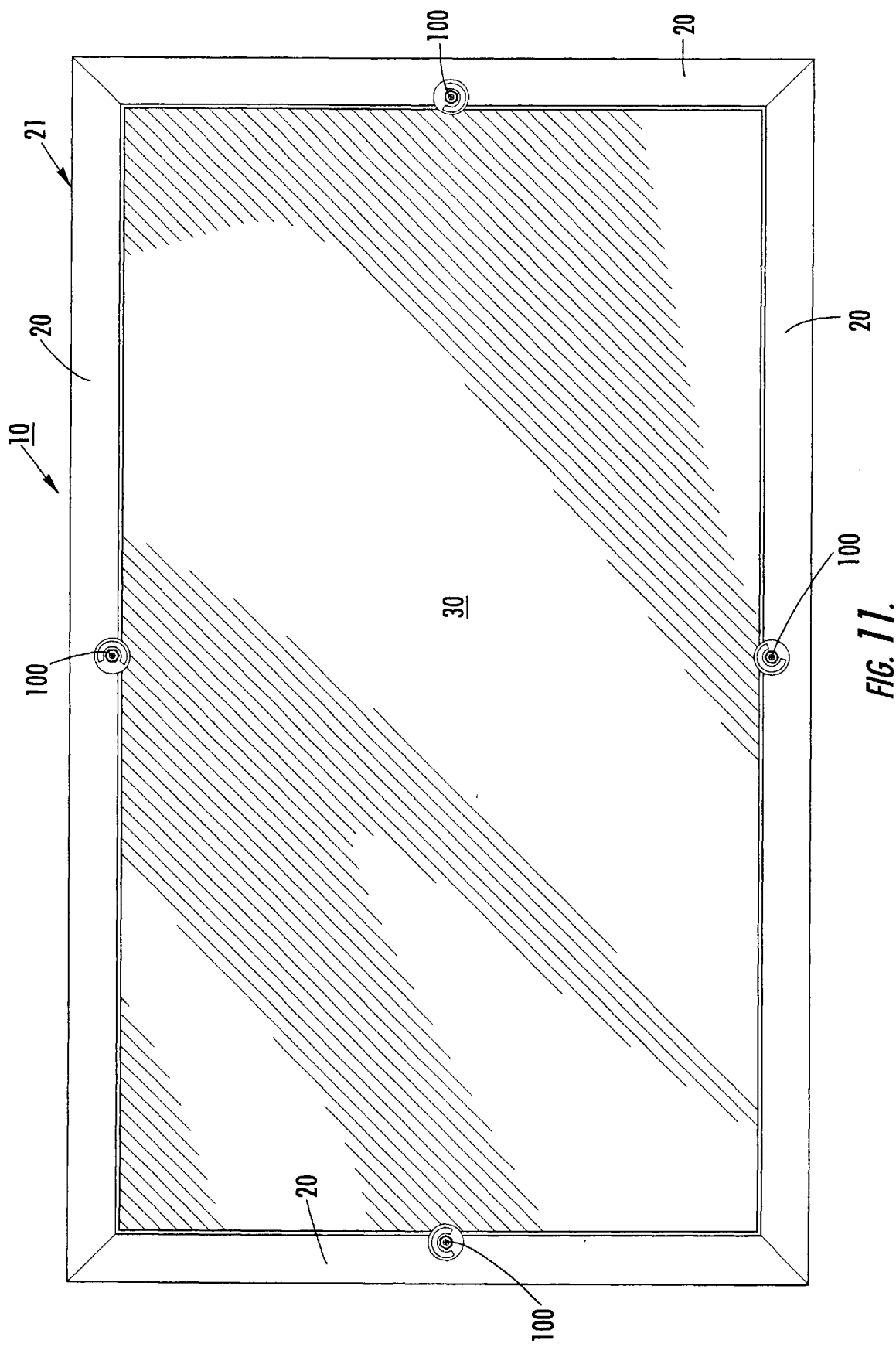
FIG. 11 is a rear elevational view of the frame/panel assembly according to the present invention.

With reference to FIGS. 1–4, a retainer clip 100 according to preferred embodiments of the present invention is shown therein. The clip 100 may be used along with a screw 150 or other suitable fastener to form a frame/panel assembly 10 as shown in FIGS. 10 and 11. More particularly, the frame/panel assembly 10 includes a panel member 30 secured to a frame 21 (including a plurality of frame members 20) by a plurality of the clips 100 as described in greater detail below.

Turning to the clip 100 in more detail, the clip 100 includes a shaft 110. Preferably and as shown, the shaft 110 is cylindrically shaped with the axis thereof collinear with a central clip axis A—A. The shaft 110 has an inner end 110A and an outer end 110B spaced apart along the axis A—A.

A head 120 is positioned on the outer end 110B of the shaft 110. The head 120 extends radially outwardly (i.e., relative to the clip axis A—A) from the shaft 110. Optionally, a recess 127 is defined in the head 120 to reduce the amount of material required and/or improve molding consistency. The head 120 has an outer surface 124 and an opposing, inner cam surface 122. Preferably and as shown, the outer surface 124 lies generally in a plane that is substantially perpendicular to the axis A—A. The cam surface 122 extends circumferentially and, more particularly, helically, about the shaft 110. Preferably and as shown, the head 120 and the cam surface 122 extend fully about the circumference of the shaft 110. However, the head 120 and the cam surface 122 may be abbreviated to define a circumferential gap therein (not shown). The head 120 and the cam surface 122 have a diameter D1 (FIG. 4) that is greater than the diameter D3 of the shaft 110. Preferably, the diameter D1 is between about ¼ and 1 inch greater than the diameter D3. A vertical engaging wall 126 extends along a plane substantially parallel to the axis A—A between the portion of the cam surface 122 closest to the shaft end 110A and the portion of the cam surface 122 furthest from the shaft end 110A.

Figure 8:
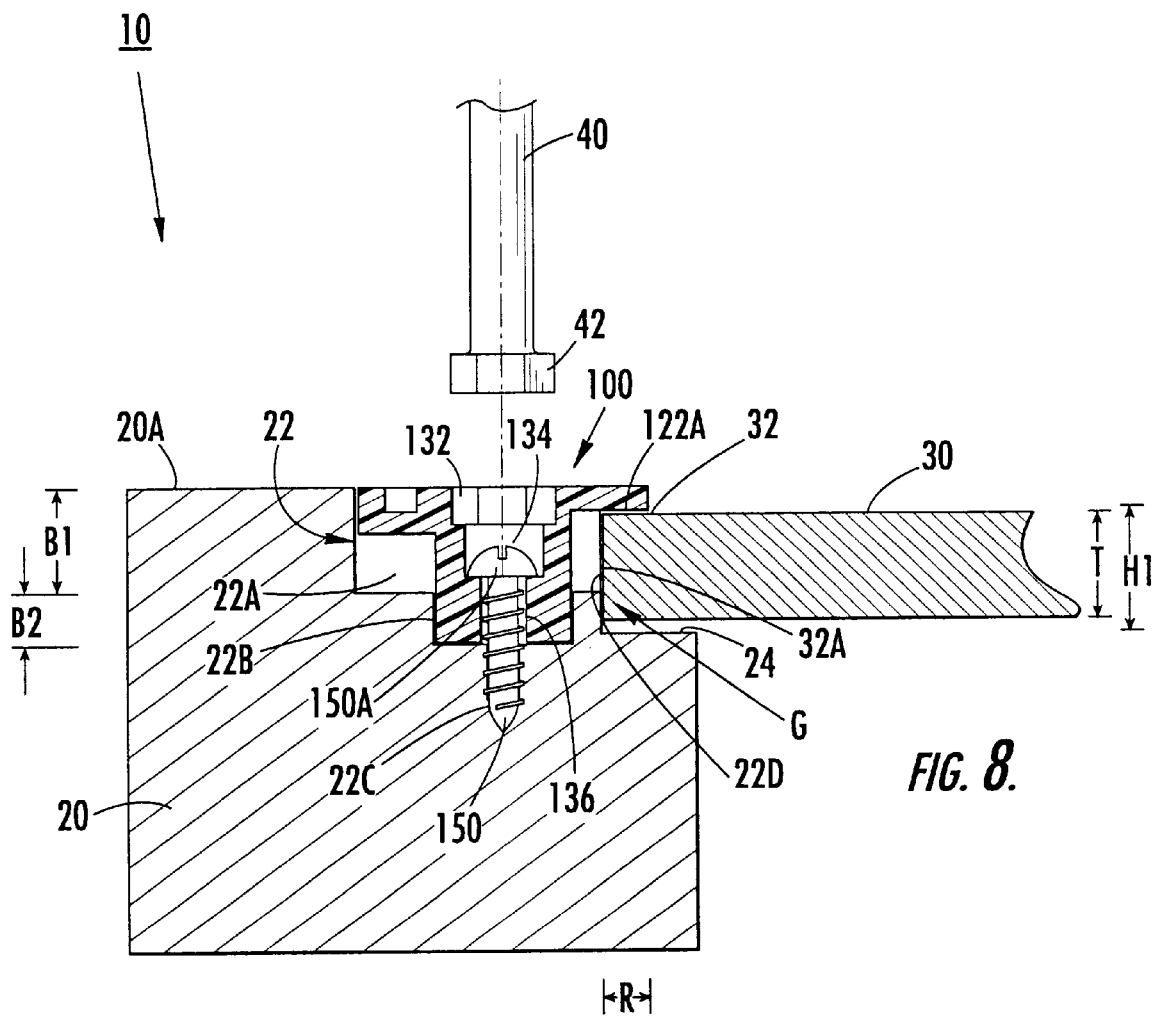
FIG. 8 is a cross-sectional view of the frame/panel assembly of FIG. 7 taken along the line 8—8 of FIG. 7, wherein the clip is in a first rotative position.
Figure 9:
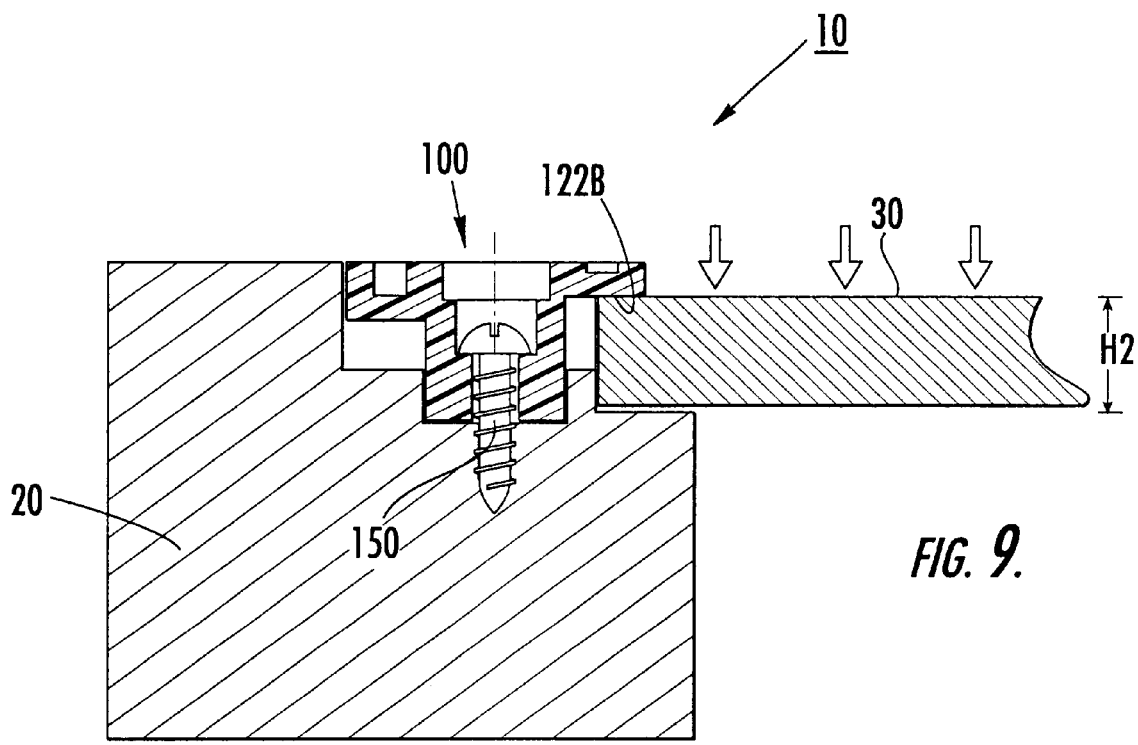
FIG. 9 is a cross-sectional view of the frame/panel assembly of FIG. 8 wherein the clip is in a second rotative position.

The axial distance (i.e., along the axis A—A) between the cam surface 122 and the inner end 110A of the shaft 110 varies along the circumferential extent of the cam surface 122. For example, as shown in FIG. 8, the cam surface 122 has a first portion 122A which is disposed a distance H1 from the shaft and 110A. As shown in FIG. 9, the cam surface 122 has a second portion 122B which is disposed a distance H2 from the shaft end 110A, the distance H2 being less than the distance H1. Further, as shown in FIG. 10, the cam surface 122 has a third portion 122C which is disposed a distance H3 from the shaft and 110A, the distance H3 being less than the distance H2. Preferably and as shown, the cam surface 122 has a substantially smooth and continuous profile. More preferably, the first portion 122A is substantially perpendicular to the axis A—A and the remainder of the cam surface 122 slopes uniformly toward the shaft end 110A.

A central passage 130 extends along the axis A—A and continuously from an outer opening 131 to an inner opening 133. The central passage 130 includes a hexagonally shaped socket 132, a circular recess 134 communicating with and having a reduced diameter as compared to the socket 132, and a screw passage 136 communicating with and having a reduced diameter as compared to the recess 134. The screw passage 136 is sized to receive the screw 150 such that the screw 150 can be freely rotated relative to the screw passage 136 but such that the head 150A of the screw 150 cannot pass into the screw passage 136. The recess 134 is sized to receive the head 150A of the screw 150.

The clip 100 is preferably formed of a polymeric material. More preferably, the clip 100 is formed of polycarbonate. Preferably, the clip 100 is unitarily and integrally injection molded as a single piece. Alternatively, the clip 100 may be machined or formed from multiple, joined pieces.

The frame/panel assembly 10 may be assembled in the following manner. The frame members 20 of the frame 21 define a central opening 27 (see FIG. 5). Frames and frame members of other designs and configurations may be employed. For the purpose of explanation, the method of assembly will be described hereinafter with respect to one of the frame members 20 and an associated clip 100. However, it will be appreciated that the remaining frame members 20 and clips 100 may be assembled and used in the same manner.

Figure 5:
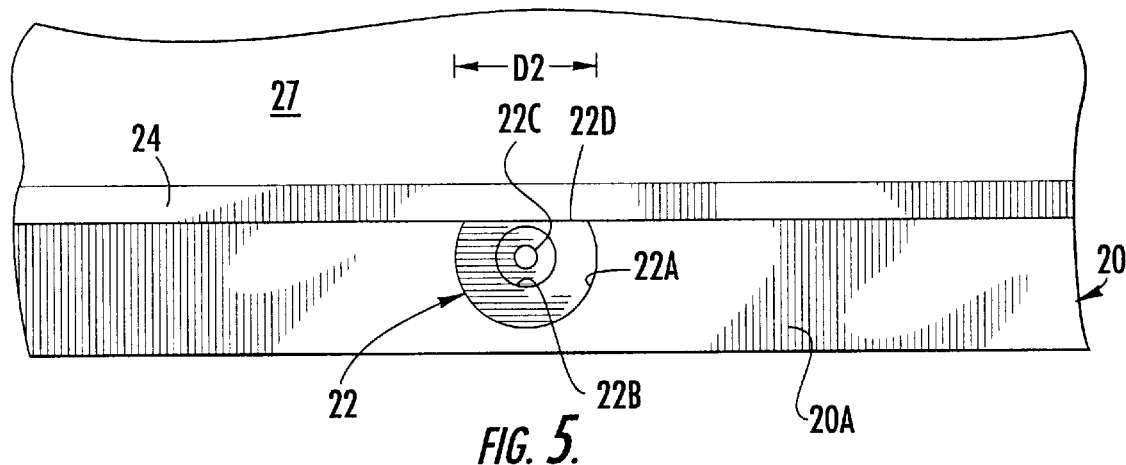
FIG. 5 is a partial, top plan view of a frame forming a part of a frame/panel assembly according to embodiments of the present invention.
Figure 7:
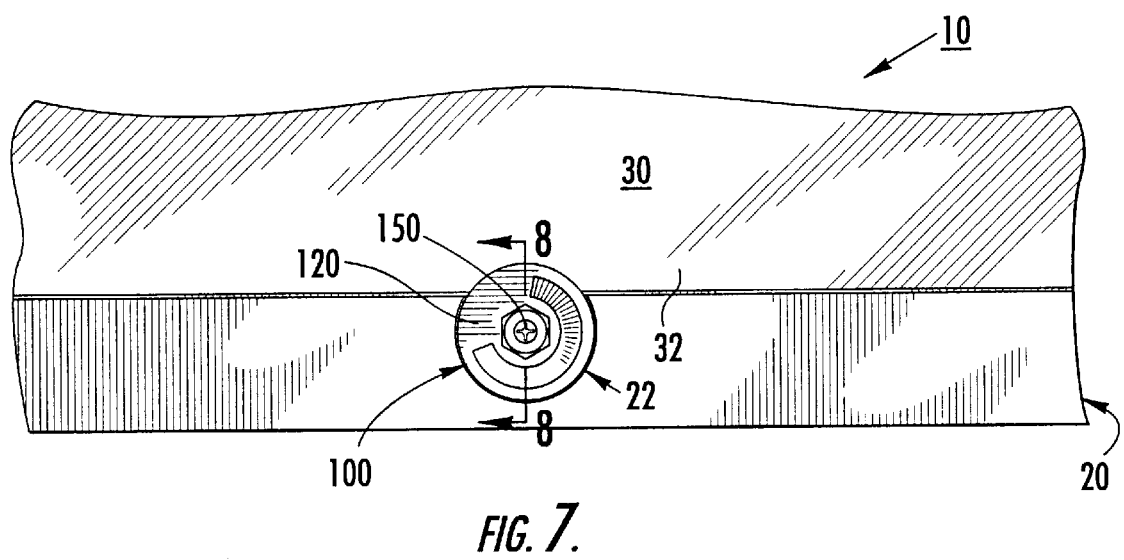
FIG. 7 is a partial, top plan view of the frame and panel of FIG. 6, wherein the clip of FIG. 1 is mounted on the frame.

With reference to FIGS. 5 and 7, the frame member 20 has a ledge 24 adjacent the opening 27. A countersunk bore 22 is drilled into a mounting surface 20A of the frame member 20. The bore 22 includes an outer, head bore 22A, an inner, shaft bore 22B and a screw bore 22C. The radius of the outer bore 22A is greater than the lateral distance between the center of the outer bore 22A and the ledge 24 so that a lateral opening 22D is formed between the outer bore 22A and the opening 27 (see FIGS. 5 and 8). Notably, the step of drilling the bore(s) may be conveniently executed at the same time as similar operations such as drilling holes for mounting hinges, for example.

Preferably, the diameter D2 (FIG. 5) of the outer bore 22A is between about 0.010 and 0.030 inch greater than the diameter D1 of the head 120. Preferably, the depth B1 (FIG. 1) of the outer bore 22A is between about 0.010 and 0.020 inch greater than the length L1 (the greatest length between the outer surface 124 and the cam surface 122; FIG. 2). Preferably, the depth B2 of the inner bore 22B is between about 0.010 and 0.020 inch less than the length L2 (the shortest length between the inner end 110A of the shaft 110 and the cam surface 122; FIG. 2). The screw bore 22C is preferably sized to serve as a tap for the screw 150.

Figure 6:
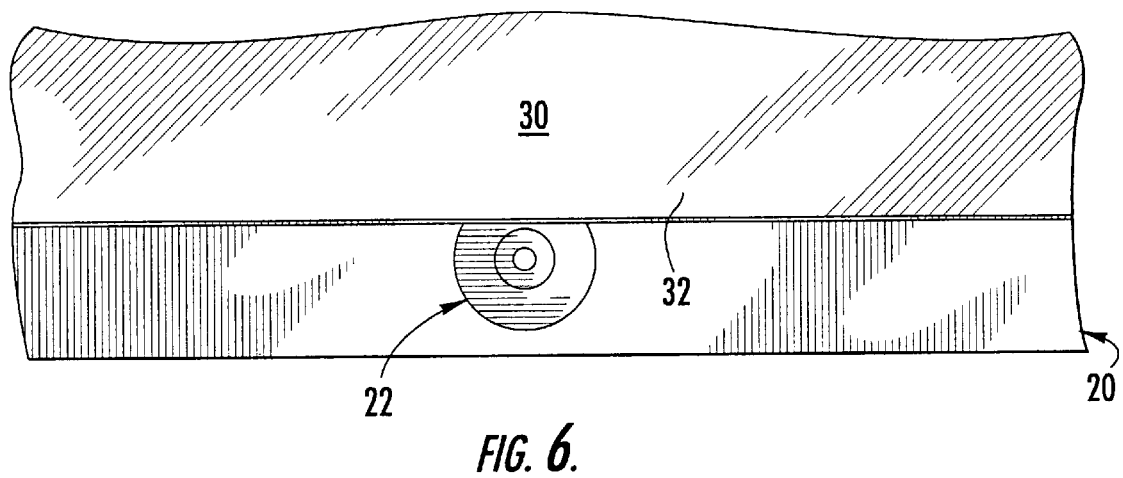
FIG. 6 is a partial, top plan view of the frame of FIG. 5 with a panel disposed therein.

The panel 30 may be a glass or plastic panel, for example. With reference to FIG. 6, the panel 30 is installed in the opening 22 of the frame 21 such that a peripheral edge portion 32 of the panel 30 overlaps the ledge 24. A portion of the edge portion 32 is disposed adjacent the bore 22.

The clip 100 is placed in the bore 30 as shown in FIGS. 7 and 8 such that the passage 130 (and, hence, the clip axis A—A) is aligned with the axis of the bore 30 and such that a portion of the head 120 extends laterally over the ledge 24 and the panel edge portion 32. More particularly, a portion of the cam surface 122 overlaps or extends laterally over the panel edge portion 32 a distance R. Preferably, the distance R is at least 0.125 inch and, more preferably, between about 0.187 and 0.250 inch. The clip 100 is rotated in the bore 30 about the clip axis A—A to position the first portion 122A of the cam surface 122 over the ledge 24 and the engaging wall 126 against the adjacent edge 32A of the panel 30. The engaging wall 126 thereby assists the installer in positioning the clip 100.

The screw 150 is inserted through the passage 30 and screwed into the screw bore 22C, preferably until the screw head 150A seats firmly against the lower wall of the bore 134. Preferably, the bore 22 and the clip 100 are relatively dimensioned such that the outer surface 124 of the clip 100 is substantially flush with the mounting surface 20A.

Initially and as shown in FIG. 8, the first portion 122A of the cam surface 122 is disposed over the panel edge portion 32, providing a gap G having a height H1 which is greater than the thickness T of the edge portion 32. Preferably, the height H1 is at least 0.010 inch greater than the thickness T and, more preferably, between about 0.020 and 0.030 inch greater.

Thereafter, a tool 40 is engaged with the clip 100 such that a driver head 42 of the tool 40 is received in the socket 132. The driver head 42 may be hexagonally shaped or otherwise shaped to operably engage the socket 132 for rotative driving. The clip 100 is rotated counterclockwise (as viewed from the side of the outer surface 124) about the axis A—A and the screw 150. In this manner, the cam surface 122 is repositioned relative to the edge portion 32 as shown in FIG. 9 such that the second portion 122B of the cam surface 122 overlies the edge portion 32 and the gap G is reduced to the height H2. The second portion 122B engages the adjacent surface of the edge portion 32, thereby displacing the edge portion 32 downward toward the ledge 24. The clip 100 is further rotated counterclockwise using the tool 40 until, as shown in FIG. 10, the third portion 122C of the cam surface 122 is positioned over the edge portion 32 and the gap G is reduced to the height H3. The third portion 122 engages the adjacent surface of the edge portion 32, thereby clamping the panel edge portion 32 between the cam surface portion 122C and the ledge 24.

In the foregoing manner, each of the clips 100 can be installed on the frame 21 to secure the panel 30 in place. Preferably, the panel 30 is placed in the frame 21 following formation of the bores 22 and prior to installation of the clips 100. Alternatively, one or more of the clips 100 may be mounted on the frame 21 and the panel 30 thereafter inserted into the gap(s) G between the pre-installed clip(s) and the ledge(s) 24.

Because the cam surface 122 is continuously sloped, the clip 100 may be used to accommodate and securely retain panel edge portions 32 having any thickness within a prescribed range. Additionally, the continuous slope of the cam surface 122 reduces the effort required to rotate the clip 100 into the clamping or locked position as well as any damage that may be caused to the clip 100 or the panel 30 as the clip 100 is rotated into the clamping position.

Tools and tool engagement structures of configurations other than those of the tool 40 and the socket 132 may be employed. If desired, a suitable cap may be inserted into or over the socket 132 after the panel is clamped in place.

Figure 12:
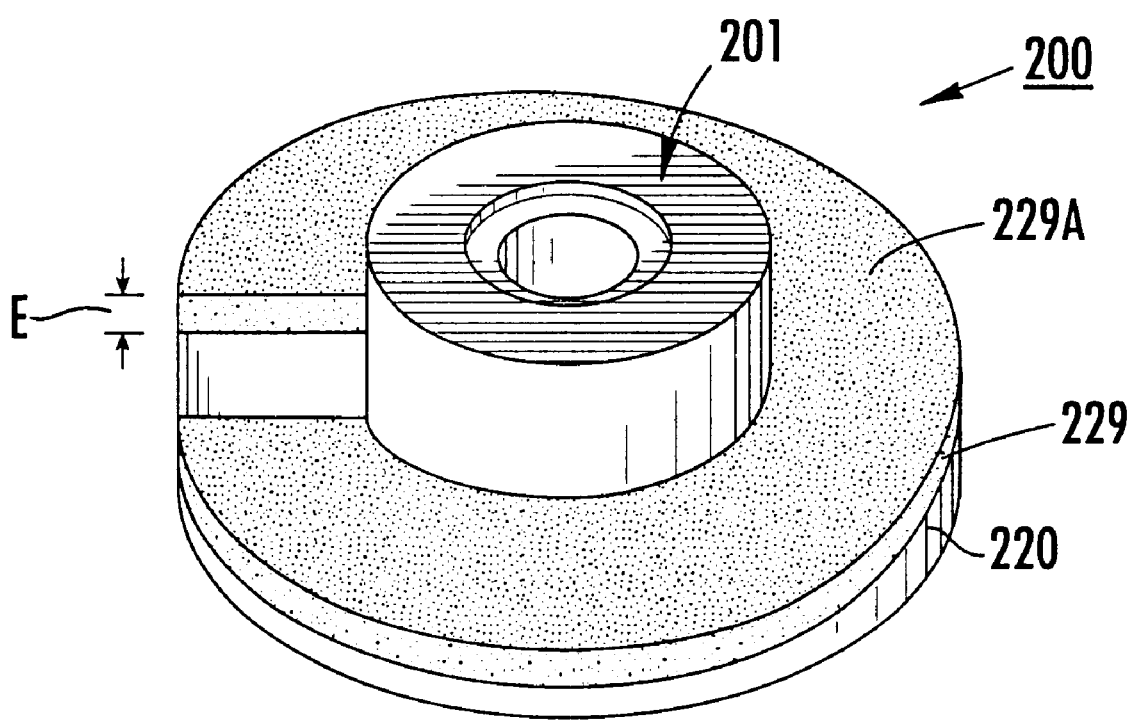
FIG. 12 is a bottom, front perspective view of a clip according to further embodiments of the present invention.

With reference to FIG. 12, a clip 200 according to further embodiments of the present invention is shown therein. The clip 200 has a body 201 which corresponds to the clip 100 except that the head 220 thereof preferably has a reduced thickness as compared to the thickness of the head 120. A supplemental layer 229 is bonded or otherwise secured to the inner surface of the head 220.

The layer 229 is formed of a softer material than the body 201. Preferably, the layer 229 is formed of an elastomeric material such as silicone rubber and the body 201 is formed from a rigid material such as polycarbonate. More preferably, the layer 229 has a Shore "A" hardness of between about 60 and 90 Shore "A". Preferably, the layer 229 has a substantially uniform thickness E. More preferably, the thickness E is between about 0.030 and 0.060 inch.

The clip 200 may be used in the same manner as the clip 100 as described above. In the case of the clip 200, the inner surface 229A of the layer 229 serves as the cam surface. The softer engaging layer 229 may serve to protect the surface of the panel and to more securely retain the panel in the frame.

Figure 13:
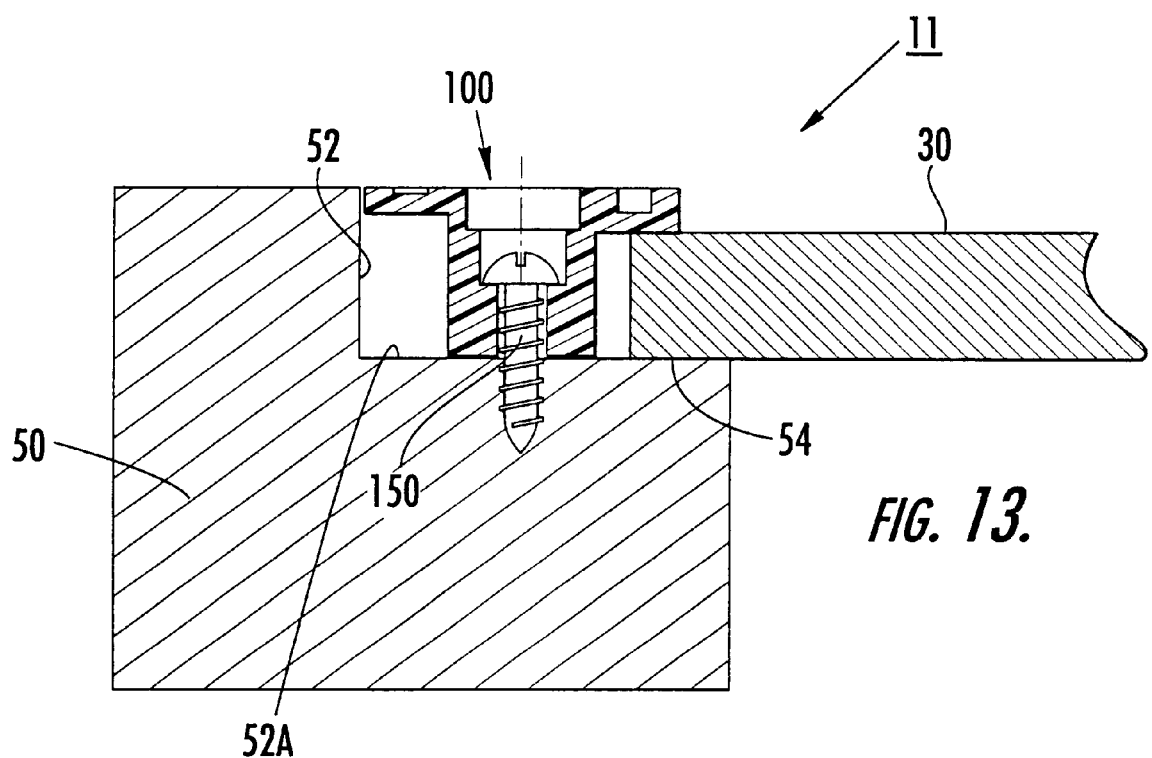
FIG. 13 is a cross-sectional view of a frame/panel assembly according to further embodiments of the present invention.

With reference to FIG. 13, a frame/panel assembly 11 according to further embodiments of the present invention is shown therein. As shown, the assembly 11 includes the retainer clip 100 (as shown, however, the clip 200 may be used in place of the clip 100), the panel member 30 and the screw 150 and otherwise corresponds to the assembly 10 except as follows. The assembly 11 includes a frame member 50 having a bore 52 formed therein. The bore 52 preferably has a uniform diameter corresponding to that of the head bore 22A. The end wall 52A of the bore 52 is substantially coplanar with the ledge 54. Suitable methods for forming the base 52 and assembling the frame/panel assembly will be apparent to those of skill in the art upon reading the description herein.

Figure 14:
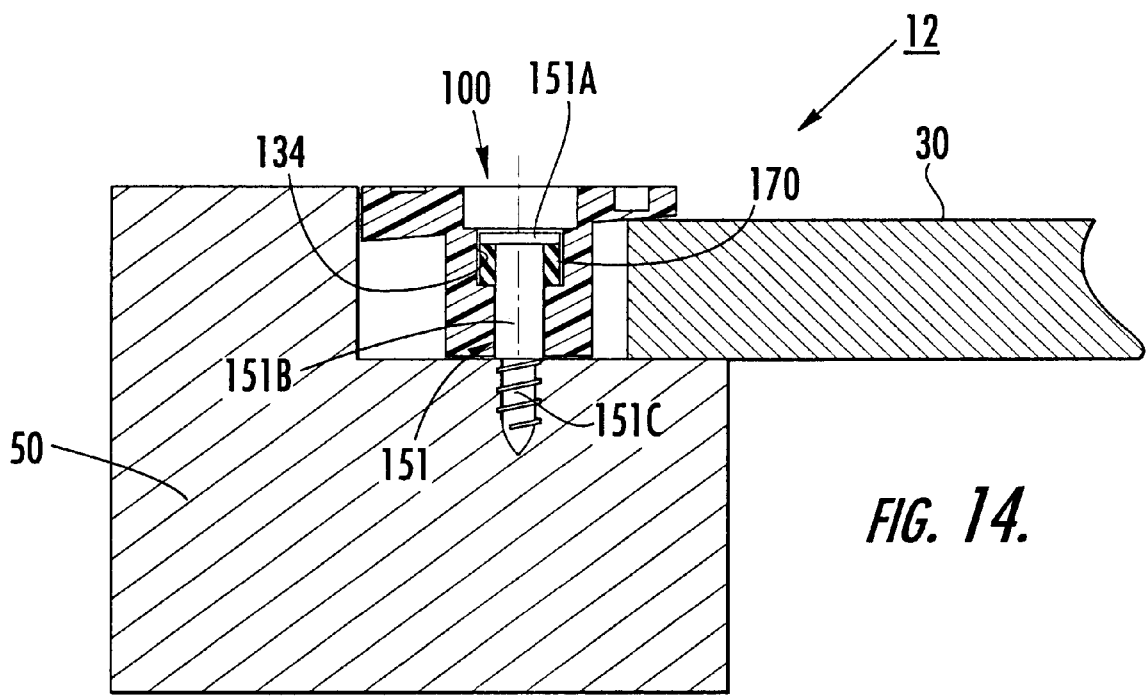
FIG. 14 is a cross-sectional view of a frame/panel assembly according to further embodiments of the present invention.

With reference to FIG. 14, a frame/panel assembly 12 according to further embodiments of the present invention is shown therein. As shown, the assembly 12 includes the retainer clip 100, the frame member 50 and the panel member 30. Alternatively, the clip 100 may be replaced with the clip 200 and/or the frame member 50 may be replaced with the frame member 20.

A shoulder bolt 151 is provided in place of the screw 150. The shoulder bolt 151 has a head 151A, a smooth, enlarged upper shank portion 151B, and a lower threaded portion 151C. An annular spacer 170 is interposed between the head 151A and the bottom wall of the recess 134. The spacer 170 is formed of a softer material than the clip 100. Preferably, the spacer 170 is formed of an elastomeric material such as silicone rubber.

The assembly 12 may be assembled in the same manner as the assemblies 10, 11 except that the spacer 170 is installed between the bolt 151 and the clip 100 as illustrated. The flexible spacer 170 allows for some movement between the clip 100 and the frame member 50. This flex may provide a more secure fit between the panel 30 and the frame member 50.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A retainer clip for use with a mounting surface comprising:
   a) a shaft extending along a clip axis, said shaft having a shaft diameter and first and second opposed ends; and
   b) a head extending radially outwardly from said shaft adjacent said first end of said shaft, said head having a head diameter which is greater than said shaft diameter, said head including a cam surface extending circumferentially about said shaft and facing said second end;
   c) a central passage extending through said head and said shaft; and
   d) a fastener extending through said central passage and configured to engage the mounting surface adjacent said second end so that, when said clip is installed with said second end adjacent the mounting surface, said cam surface and said mounting surface define a gap therebetween;
   e) wherein at least two portions of said cam surface located at different circumferential positions about said shaft are disposed at different axial distances from said second end;
   f) wherein said clip is rotatable about and relative to said fastener.

2. The clip of claim 1 wherein said cam surface slopes axially about the circumference of said shaft.

3. The clip of claim 2 wherein at least a portion of said cam surface is helically shaped.

4. The clip of claim 1 wherein said fastener is a screw.

5. The clip of claim 1 including a tool engaging structure adapted to engage a tool for rotating said clip about said clip axis.

6. The clip of claim 5 wherein said tool engaging structure includes a tool receiving socket in said head.

7. The clip of claim 1 including an axially extending engagement surface.

8. The clip of claim 1 wherein said clip is formed of a polymeric material.

9. The clip of claim 8 wherein said clip is a unitarily molded piece.

10. The clip of claim 1 including a body formed of a first material and an engagement layer formed of a second, relatively softer material, wherein said cam surface forms a part of said engagement layer.

11. A frame/panel assembly comprising:
    a) a frame member having a mounting surface;
    b) a retainer clip comprising:
       1) a shaft extending along a clip axis, said shaft having a shaft diameter and first and second opposed ends;
       2) a head extending radially outwardly from said shaft adjacent said first end of said shaft, said head having a head diameter which is greater than said shaft diameter, said head including a cam surface extending circumferentially about said shaft and facing said second end;
       3) a central passage extending through said head and said shaft; and
       4) a fastener extending through said central passage and into said frame member;
       5) wherein at least two portions of said cam surface located at different circumferential positions about said shaft are disposed at different axial distances from said second end;
       6) wherein said clip is secured to said mounting surface such that said clip is rotatable relative to said fastener about said clip axis and said cam surface and said mounting surface define a gap therebetween; and
    c) a panel member including an edge portion disposed in said gap and retained on said frame by said head of said clip.

12. The assembly of claim 11 wherein said cam surface slopes axially about the circumference of said shaft.

13. The assembly of claim 12 wherein at least a portion of said cam surface is helically shaped.

14. The assembly of claim 11 including a flexible spacer interposed between said fastener and said clip.

15. The assembly of claim 11 including a clip bore defined in said frame, wherein said shaft is disposed in said clip bore.

16. The assembly of claim 15 wherein:
    said clip bore includes an inner, shaft bore and an adjacent outer, head bore; and
    said shaft is disposed in said shaft bore and said head is disposed in said head bore.

17. The assembly of claim 14 wherein:
    said frame member includes a ledge and said edge portion of said panel member is disposed on said ledge; and
    said clip bore has a substantially uniform diameter and an end wall which is substantially coplanar with said ledge.

18. The assembly of claim 11 including a tool engaging structure adapted to engage a tool for rotating said clip about said clip axis.

19. The assembly of claim 18 wherein said tool engaging structure includes a tool receiving socket in said head.

20. The assembly of claim 11 wherein said clip includes a body formed of a first material and an engagement layer formed of a second, relatively softer material, wherein said cam surface forms a part of said engagement layer and engages said panel member.

21. A method for retaining a panel member on a frame member, said method comprising the steps of:
    a) placing the panel member on the frame member, the frame member having a mounting surface;
    b) mounting a retainer clip on the frame member such that the clip is rotatable about a clip axis, the clip comprising:
       1) a shaft extending along the clip axis, the shaft having a shaft diameter and first and second opposed ends;
       2) a head extending radially outwardly from the shaft adjacent the first end of the shaft, the head having a head diameter which is greater than the shaft diameter, the head including a cam surface extending circumferentially about the shaft and facing the second end;
       3) wherein at least two portions of the cam surface located at different circumferential positions about the shaft are disposed at different axial distances from the second end;
       4) wherein the cam surface and the mounting surface define a gap therebetween and an edge portion of the panel member is disposed in the gap; and
    c) rotating the clip relative to the frame member about the clip axis such that the cam surface reduces the size of the gap, thereby clamping the panel member between the frame member and the cam surface;
    d) wherein said step of mounting the clip on the frame member includes inserting a fastener through a central passage extending through the head and the shaft and into the frame; and e) wherein said step of rotating the clip relative to the frame member includes rotating the clip about and relative to the fastener.

22. The method of claim 21 wherein said step of placing the panel member on the frame member precedes said step of mounting the clip on the frame member.

23. The method of claim 21 wherein the cam surface slopes axially about the circumference of the shaft.

24. The method of claim 23 wherein at least a portion of the cam surface is helically shaped.

25. The method of claim 21 including the steps of:
    a) forming a bore in the frame member; and
    b) inserting the shaft of the clip into the bore.

26. The method of claim 21 including the step of forming a bore including an inner, shaft bore and an adjacent outer, head bore, and wherein said step of mounting the clip on the frame member includes placing the shaft in the shaft bore and placing the head into the head bore.

27. The method of claim 21 including the step of placing a flexible spacer between the fastener and the clip.

28. The method of claim 21 wherein said step of rotating the clip relative to the frame member includes engaging a tool engaging structure of the clip with a tool and rotating the clip using the tool.

29. The method of claim 21 wherein said step of mounting the retainer clip on the frame member includes placing an axially extending engagement surface of the clip against an adjacent edge of the panel member.

30. The method of claim 21 wherein the clip includes a body formed of a first material and an engagement layer formed of a second, relatively softer material, wherein the cam surface forms a part of the engagement layer, and wherein said step of rotating the clip relative to the frame includes bringing the engagement surface into contact against the panel member.

31. The assembly of claim 15 wherein said clip bore is adapted to receive said clip in a direction along said clip axis.

32. A retainer clip comprising:
    a) a shaft extending along a clip axis, said shaft having a shaft diameter and first and second opposed ends; and
    b) a head extending radially outwardly from said shaft adjacent said first end of said shaft, said head having a head diameter which is greater than said shaft diameter, said head including a cam surface extending circumferentially about said shaft and facing said second end;
    c) wherein at least two portions of said cam surface located at different circumferential positions about said shaft are disposed at different axial distances from said second end;
    d) wherein said clip includes a body formed of a first material and an engagement layer formed of a second, relatively softer material; and
    e) wherein said cam surface forms a part of said engagement layer.

33. A frame/panel assembly comprising:
    a) a frame member having a mounting surface;
    b) a retainer clip comprising:
        1) a shaft extending along a clip axis, said shaft having a shaft diameter and first and second opposed ends;
        2) a head extending radially outwardly from said shaft adjacent said first end of said shaft, said head having a head diameter which is greater than said shaft diameter, said head including a cam surface extending circumferentially about said shaft and facing said second end;
        3) wherein at least two portions of said cam surface located at different circumferential positions about said shaft are disposed at different axial distances from said second end;
        4) wherein said clip is secured to said mounting surface such that said clip is rotatable about said clip axis and said cam surface and said mounting surface define a gap therebetween; and
    c) a panel member including an edge portion disposed in said gap and retained on said frame by said head of said clip;
    d) wherein said clip includes a body formed of a first material and an engagement layer formed of a second, relatively softer material, wherein said cam surface forms a part of said engagement layer and engages said panel member.

34. A method for retaining a panel member on a frame member, said method comprising the steps of:
    a) placing the panel member on the frame member, the frame member having a mounting surface;
    b) mounting a retainer clip on the mounting surface such that the clip is rotatable about a clip axis, the clip comprising:
        1) a shaft extending along the clip axis, the shaft having a shaft diameter and first and second opposed ends;
        2) a head extending radially outwardly from the shaft adjacent the first end of the shaft, the head having a head diameter which is greater than the shaft diameter, the head including a cam surface extending circumferentially about the shaft and facing the second end;
        3) wherein at least two portions of the cam surface located at different circumferential positions about the shaft are disposed at different axial distances from the second end;
        4) wherein the cam surface and the mounting surface define a gap therebetween and an edge portion of the panel member is disposed in the gap; and
    c) rotating the clip relative to the frame member about the clip axis such that the cam surface reduces the size of the gap, thereby clamping the panel member between the mounting surface and the cam surface,
    d) wherein the clip includes a body formed of a first material and an engagement layer formed of a second, relatively softer material, wherein the cam surface forms a part of the engagement layer, and wherein said step of rotating the clip relative to the frame includes bringing the engagement surface into contact against the panel member.

35. A method for retaining a panel member on a frame member, said method comprising the steps of:
    a) forming a bore in a mounting surface on the frame member;
    b) placing the panel member on the frame member;
    c) mounting a retainer clip on the mounting surface such that the clip is rotatable about a clip axis, said step of mounting including inserting the clip into the bore in a direction along the clip axis, the clip comprising:
        1) a shaft extending along the clip axis, the shaft having a shaft diameter and first and second opposed ends;

2) a head extending radially outwardly from the shaft adjacent the first end of the shaft, the head having a head diameter which is greater than the shaft diameter, the head including a cam surface extending circumferentially about the shaft and facing the second end;

3) wherein at least two portions of the cam surface located at different circumferential positions about the shaft are disposed at different axial distances from the second end;

4) wherein the cam surface and the mounting surface define a gap therebetween and an edge position of the panel member is disposed in the gap; and d) rotating the clip relative to the frame member about the clip axis such that the cam surface reduces the size of the gap, thereby clamping the panel member between the frame member and the cam surface.

* * * * *